United States Patent

Cricchi

[15] 3,680,062

[45] July 25, 1972

[54] RESETTABLE NON-VOLATILE MEMORY UTILIZING VARIABLE THRESHOLD VOLTAGE DEVICES

[72] Inventor: James R. Cricchi, Baltimore, Md.

[73] Assignee: Westinghouse Electric Corporaton, Pittsburgh, Pa.

[22] Filed: June 24, 1970

[21] Appl. No.: 49,101

[52] U.S. Cl. ....................................340/173 R, 102/70.2 GA

[51] Int. Cl. ..........................................................G11c 11/40

[58] Field of Search ...............340/173 R, 172.5; 102/70.2 A, 102/70.2 G, 70.2 GA, 70.2 R; 307/279, 238

[56] References Cited

UNITED STATES PATENTS

| | | | |
|---|---|---|---|
| 3,508,211 | 4/1970 | Wegener | 340/173 R |
| 3,549,911 | 12/1970 | Scott, Jr. | 307/279 |
| 3,571,809 | 3/1971 | Nelson | 340/173 R |
| 3,573,757 | 4/1971 | Adams | 340/173 R |
| 3,533,088 | 10/1970 | Rapp | 340/173 R |
| 3,234,524 | 2/1966 | Roth | 340/172.5 |
| 3,549,911 | 12/1970 | Scott, Jr. | 340/173 X |

*Primary Examiner*—Stanley M. Urynowicz, Jr.
*Attorney*—F.H. Henson and E. P. Klipfel

[57] ABSTRACT

A non-volatile memory employing variable threshold voltage field effect transistors as main memory storage elements is utilized in a fuse system for detonating explosive projectiles. Each transistor is selectively set to first and second stable threshold voltages by applying positive or negative polarizing voltages between the gate and the source of the transistor. The threshold voltage state of the transistor is determined by applying a read voltage having a magnitude greater than the first stable threshold voltage and less than the second stable threshold voltage. The transistor is activated only if it has assumed the first threshold voltage. A buffer shift register is provided for receiving a serial data input and producing a corresponding parallel output of positive and negative polarizing voltages. The information in the buffer shift register is transferred to the main memory by a plurality of write transmission gates and is transferred from the main memory to the shift register by a plurality of read transmission gates. A fire command generated by the firing of a projectile, such as an artillery shell, transfers the information in the main memory to a counter. The counter is then operated until overflow occurs and a signal is generated by the counter to detonate the explosive projectile.

12 Claims, 5 Drawing Figures

RESETTABLE NON-VOLATILE MEMORY UTILIZING VARIABLE THRESHOLD VOLTAGE DEVICES

BACKGROUND OF THE INVENTION

1. Field of the Invention

This invention relates to a memory for use in a fuse system, and particularly to an electrically resettable non-volatile memory utilizing variable threshold voltage transistors selectively polarizable to either of two states.

2. Description of the Prior Art

In the prior art, magnetic cores have typically been used as the memory elements in memories for fuse systems. A magnetic core provides a non-volatile memory which can retain stored information in the form of a flux field and which is electrically resettable. Further, the value stored in the memory core may be read out of the core a limited number of times to determine the information stored in the memory. However, in certain applications, it is desired that the physical size of the memory be extremely small. In these situations, the magnetic core memory is too large for use in the system.

Another disadvantage with magnetic cores is the high power requirements of the drive circuitry for setting the magnetic flux state of a magnetic core.

These and other disadvantages of prior art memories, particularly concerning fuse system memories, are overcome by the memory of the invention.

SUMMARY OF THE INVENTION

In the present invention an electrically resettable non-volatile memory is provided for use in a fuse system. Variable voltage threshold devices such a insulated gate field effect transistors of the metal insulator semiconductor (MIS) type are utilized as storage elements in the main memory. The threshold voltage of each storage element may be varied by applying a polarizing voltage between the gate and the source of the transistor to cause the threshold to shift between a first stable threshold voltage state and a second stable threshold voltage state. By selectively setting to the stable threshold states, the devices may be utilized as bit memory elements to store binary information in a manner analogous to the use of the selectively oriented, stable magnetic flux states of a magnetic core for information storage.

A shift register is provided in the memory and serves as buffer storage for data transferred to and from the main memory. A plurality of write transmission gates, such as conventional field effect transistors, are provided to couple, on command, the shift register polarizing voltage output to the input of the individual storage elements of the main memory and selectively polarize the elements. The polarized state of the storage elements in the main memory is transferred from the main memory to the buffer register by activating a plurality of read transmission gates, and simultaneously applying a read voltage to the storage elements. The read voltage is greater in magnitude than the first stable threshold voltage and less than the magnitude of the second stable threshold voltage of the storage elements. Therefore, the read voltage activates only those storage elements which have been polarized to the first threshold voltage state.

In the operation of the fuse system, a fire command generated by the firing of an explosive projectile couples the information in the main memory to a counter. The counter then operates and generates a carry signal when the counting operation is completed to detonate the explosive projectile.

DETAILED DESCRIPTION OF THE INVENTION

In accordance with the invention, there is provided a memory utilizing variable voltage threshold devices, specifically field effect transistors, for use in a timing control system. The disclosed system is particularly applicable for use as a fuse system and is described herein in that context. In general, such timing control systems require that a further control be generated a precise time interval subsequent to an event which may occur at a random time. For example, in the case of a fuse system, the further control comprises a detonate command which must be generated a prescribed time interval subsequent to the firing of a projectile, such as an artillery shell. The predetermined time interval is defined by a binary word which is stored in a memory in the system. For this purpose, the system of the invention comprises a novel memory for storage of binary information, and means for selectively interrogating and reading out said memory on command, such as in response to firing of the projectile.

Figure 1:
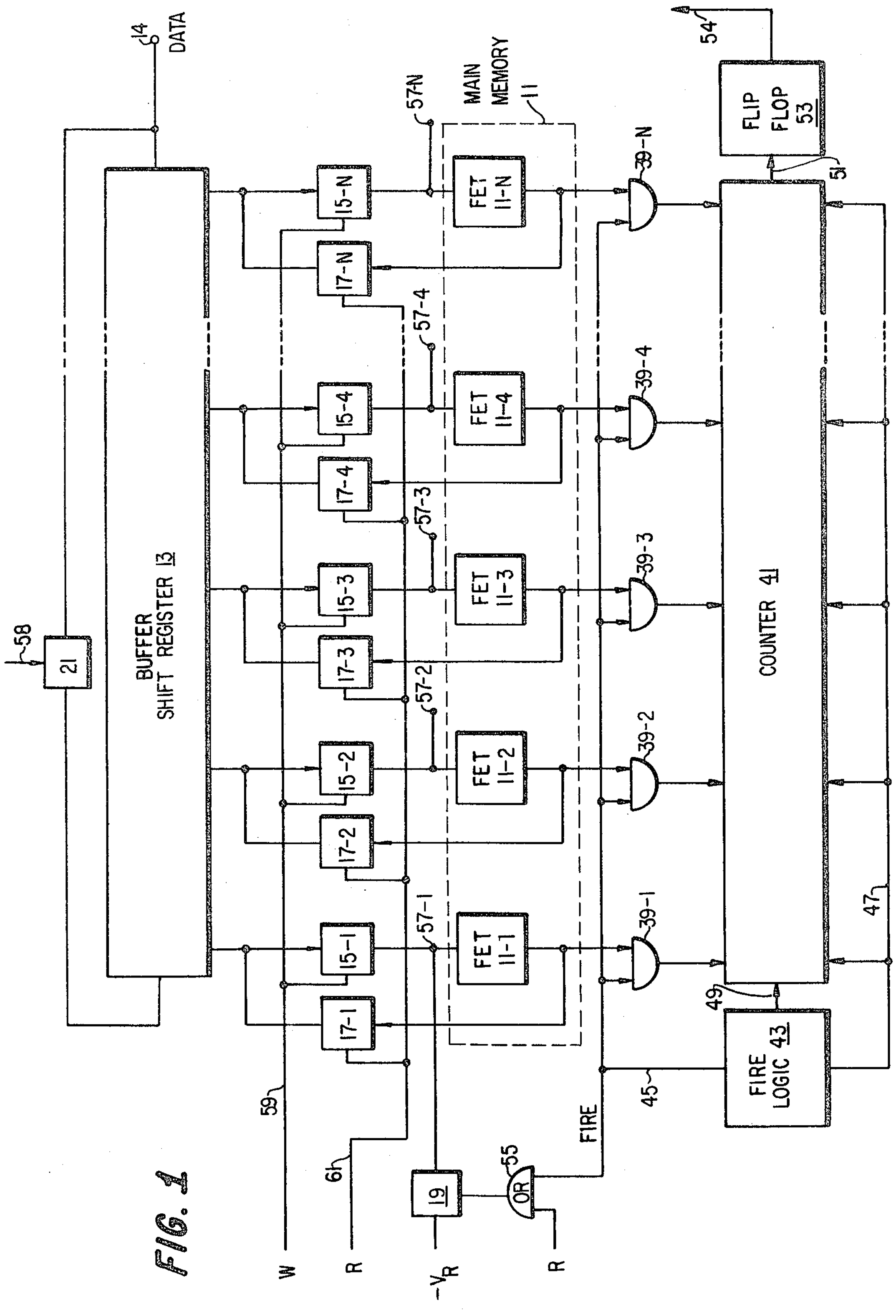
FIG. 1 shows a block diagram of a fuse system having a memory using as storage elements field effect transistors having a variable voltage threshold.

More specifically, in FIG. 1 there is shown a fuse control system having a main memory 11 which utilizes a plurality of field effect transistors 11-1 to 11-N, each transistor having a variable voltage threshold which is polarizable to either of two stable threshold states. A suitable transistor of this type is an insulated gate, field effect transistor and in particular a metal insulator semiconductor (MIS) transistor. MIS transistors suitable for use as a storage element are described in detail in application Ser. No. 49,398 by J. R. Cricchi and W. W. Beydler filed June 24, 1970 and assigned to the assignee of the present invention. Any number of transistors may be used to provide the desired number of storage elements in the main memory as indicated by the broken lines in the circuitry intermediate the transistors 11-4 and 11-N, the letter N indicating any desired number of storage elements.

A shift register 13 having a data terminal 14 is utilized as a buffer memory for receiving serial data to be transferred to the main memory 11, and for receiving data transferred from the main memory 11. Each stage of the shift register is coupled to a corresponding one of a plurality of write transmission gates 15-1 to 15-N. The outputs of the plurality of write gates 15-1 to 15-N are coupled to the input nodes 57-1 to 57-N, respectively, of a corresponding plurality of transistors 11-1 to 11-N comprising the memory storage bits. The outputs of the transistors 11-1 to 11-N are coupled to a plurality of read transmission gates 17-1 to 17-N. The outputs of read gates 17-1 to 17-N are in turn coupled to the individual stages of the shift register 13 corresponding to the storage elements 11-1 to 11-N, respectively, associated with the read gates 17-1 to 17-N. The control inputs of the write gates 15-1 to 15-N are connected in common to a write line 59, and the control inputs of the read gates 17-1 to 17-N are connected in common to a read line 61.

A read voltage transmission gate 19 is coupled to input node 57-1 of transistor 11-1 and when enabled, supplied a read voltage $-V_R$ to the transistor. Similar read voltage transmission gates (not shown) are provided for selectively supplying read voltages to the nodes 57-2 to 57-N of transistors 11-2 to 11-N, respectively.

As later detailed, to set the main memory 11, a write signal W is applied on write line 59. This signal W simultaneously enables the write transmission gates 15-1 to 15-N which then transfer the information in the shift register 13 to the transistors 11-1 to 11-N, respectively.

To determine the information set in main memory 11, a read signal R is applied to read line 61. The read signal R enables the read transmission gates 17-1 to 17-N; in time coincidence therewith, a read voltage is applied to nodes 57-1 to 57-N by the respectively corresponding voltage transmission gates as represented by gate 19. The information stored in the transistors 11-1 to 11-N is thereby read out and transferred through the enabled read gates 17-1 to 17-N to the corresponding stages of the buffer shift register 13. The information thus transferred back into the shift register is shifted left in a conventional manner and transferred through a data output transmission gate 21 when enabled, as later explained, to provide a serial data output at data terminal 14.

Before proceeding with the detailed description of the system of FIG. 1, there is first considered below the characteristics of the devices comprising the memory elements 11-1 to 11-N and the transmission gates such as gate 19 used in the system of FIG. 1.

Figure 2B:
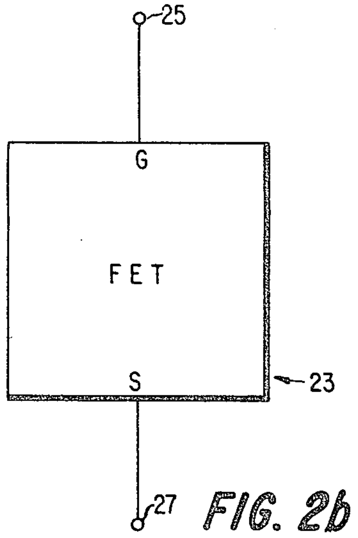
FIGS. 2*a* and 2*b* show a schematic diagram and a block diagram, respectively, of the field effect transistor having a variable voltage threshold used in the memory of the present invention.
Figure 2A:
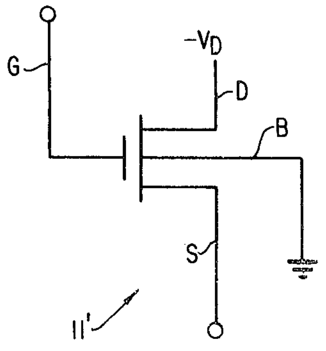

FIGS. 2*a* and 2*b* show a schematic diagram and a block diagram, respectively, of a field effect transistor 11′ having a variable voltage threshold of the type utilized as storage elements 11-1 to 11-N in the memory 11. The transistor 11′ and its operation is described in detail in the above-mentioned Cricchi et al. application. In general, however, the transistor 11′ preferably comprises a P-channel metal insulator semiconductor (MIS) field effect transistor having a variable threshold voltage. Alternatively, N-channel transistors having a variable threshold voltage may be used in the system. The MIS transistor is selectively polarizable to first and second stable threshold voltage conditions in response to corresponding positive and negative polarizing voltages $V_P$ applied thereto.

The transistor 11′ has a gate electrode G, a drain electrode D, a source electrode S, and a body electrode B. In the main memory 11, the body electrode B of the transistor 11′ is connected to ground while the drain electrode D of the transistor is connected to a drain voltage $-V_D$. The drain voltage is preferably the same magnitude as the polarizing voltage $V_P$ but may be any magnitude which is at least as large as the voltage applied to the source electrode S. The gate electrode G of the transistor serves as a storage element input and the source electrode S of the transistor serves as a storage element output.

In the operation of the transistor as a storage element, when a positive polarizing voltage $+V_P$ is applied to the gate electrode G with the source electrode S at ground potential, the transistor assumes a first stable threshold state. When a negative polarizing voltage $-V_P$ is applied to the gate electrode G with the source electrode S remaining at ground potential, the transistor assumes a second stable threshold state. The transistor is capable of retaining itself in either of the first and second stable threshold voltage states to which it has been polarized without the application of power for substantially indefinite periods of time due to a charge storage effect in the transistor. Thus, the transistor serves as a non-volatile storage element.

Typically, the magnitudes of the positive and negative polarizing voltages are ±45 volts and of the first and second threshold voltages are −2 volts and −15 volts, respectively. It is to be understood that these values are only representative and that devices having different voltage levels may be used in the practice of the invention. Further, devices also suitable for the practice of the invention are known in which a positive polarizing voltage causes the threshold voltage to shift more negative while a negative threshold voltage causes the threshold voltage to shift more positive in a manner opposite to that of the described transistor.

A voltage applied to the gate electrode G which is substantially less than the magnitude of the polarizing voltage, e.g., $V_P/2$, does not affect the threshold condition of the transistor. Therefore, after the transistor has been set to either stable threshold, the transistor may be operated in the same manner as a conventional field effect transistor provided that the voltage applied to the transistor is substantially less than the polarizing voltage $V_P$.

In order to determine the polarized or stable threshold voltage state of the transistor 11′, such as when utilized as a storage element, a read voltage $-V_R$ is applied to the gate electrode G. The magnitude of of the read voltage $-V_R$ is greater than the first threshold voltage and less than the second threshold voltage and is therefore substantially less than the magnitude of the polarizing voltage. Thus, if the transistor is in the first threshold voltage state, application of the read voltage $-V_R$ to the gate electrode G turns the transistor "on" and the negative voltage ($V_D - V_{t1}$) appears at the source electrode S, where $V_D$ is the magnitude of the drain voltage and $V_{t1}$ is the magnitude of the first threshold voltage. However, if the transistor has been polarized to assume the second threshold voltage state, the read voltage is insufficient to turn the transistor "on;" the transistor thus remains in the "off state" and a potential of zero volts or ground potential appears at the source electrode S.

The transistor 11′ of FIG. 2*a* is shown as a block diagram 23 in FIG. 2*b*, in a form representative of the transistors 11-1 to 11-N used in the main memory as shown in FIG. 1. The input terminal 25 of the block diagram is coupled to the gate electrode G of the transistor 11′ while the output terminal 27 is coupled to the source electrode S. The drain electrode D and the body electrode B of the transistor 11′ are connected to the drain voltage $-V_D$ and ground, respectively, and are not shown in the block diagram 23.

Figure 3B:
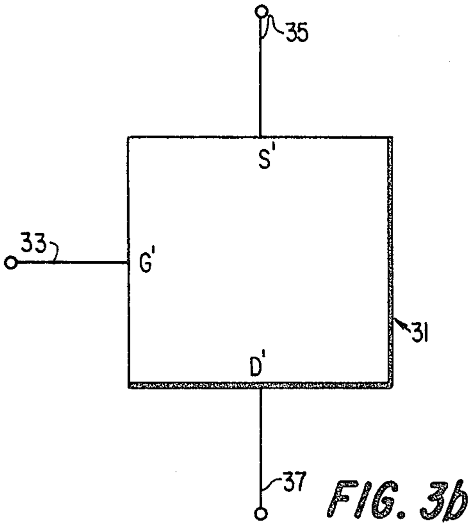
FIGS. 3*a* and 3*b* show a block diagram and a schematic diagram, respectively, of a transmission gate used in the memory of the present invention.
Figure 3A:
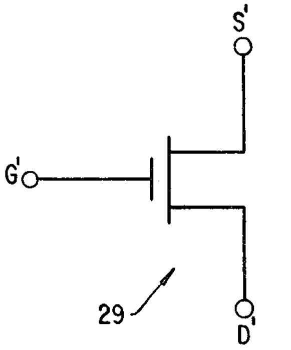

FIGS. 3*a* and 3*b* show a schematic diagram and a block diagram, respectively, of a transmission gate used in the memory. The transmission gate comprises a conventional field effect transistor 29 having a gate electrode G′, a source electrode S′, and a drain electrode D′. When a voltage greater than the threshold voltage of the transistor is applied to the gate electrode G′ the transistor is turned on, and conduction occurs between the source electrode S′ and the drain electrode D′. Thus, the transistor serves as a solid state switch which is closed in response to a voltage at its gate greater than its threshold and is open when the voltage presented at its gate is less than its threshold. A block diagram 31 of the transistor 29 is shown in FIG. 3*b* and is representative of the transmission gates used in FIG. 1. The control input 33 of block diagram 31 is connected to the gate electrode G′ of the transistor 29 as shown in FIG. 3*a* and similarly, the other terminals 35 and 37 of the block diagram 31 are connected to the drain electrode D′ and the source electrode S′, respectively, of the transistor 29.

Considering now the system of FIG. 1 in more detail, the output of each of the transistors 11-1 to 11-N of main memory 11 is coupled to the first input of a corresponding one of a plurality of two input AND gates 39-1 to 39-N. The output of each of the gates 39-1 to 39-N is coupled to a corresponding one of the set inputs of an N-stage counter 41.

The fuse system includes fire logic 43 having a fire signal output lead 45, a reset signal output lead 47, and a clock signal output lead 49. When an explosive projectile is fired, fire logic 43 is actuated to generate in sequence, the reset signal on the reset output lead 47 and subsequently the fire signal on the fire output lead 45. The reset signal is coupled by lead 47 to each of the stages of the counter 41 and serves to initialize the counter. The fire signal is coupled by lead 45 to the second input of each of the AND gates 39-1 to 39-N and enables the gates to transfer the information in each of the bits of the main memory 11 to the corresponding set inputs of the counter 41. Thus, the counter 41 is set to the data word stored in the main memory upon occurrence of the fire signal.

After the data word is set in the counter 41, the fire logic 43 generates a train of clock signals on the lead 49, the latter being connected to the stepping input of the counter 41. The counter 41 steps in response to each clock signal and, when the counter overflows, generates a carry signal on output lead 51. The carry signal sets a detonate flip-flop 53 which, when set, produces a detonate command, or output signal, on output lead 54 for detonating the explosive projectile.

The read voltage transmission gate 19 couples the read voltage $-V_R$ to the control input 57-1 of the transistor 11-1 during read-out of the main memory. The output of an OR gate 55 is coupled to the control input of the read voltage gate 19. The OR gate 55 has its inputs coupled to the read signal R and the FIRE signal from the fire output 45. Thus, the read voltage gate 19 applies the voltage $-V_R$ to the control input 57-1 of the transistor 11-1 when either the read signal R or the FIRE signal from fire logic 43 is present at the inputs of the OR gate 55. As previously mentioned, a similar read voltage gate, controlled by an associated OR gate, is coupled to each of the control inputs 57-2 to 57-N of transistors 11-2 to 11-N, respectively, but are not shown to avoid crowding of the drawing.

The read signal R simultaneously energizes the read gates 17-1 to 17-N and the read voltage gates (not shown) including, and corresponding to, the gate 19, with the result that the data word in the memory 11 is transferred to the buffer register 13. After the information in the main memory has been transferred to the shift register 13, the data output transmission gate 21 is energized by a signal at control input 58 and the information in the shift register is shifted to the left. Gate 21, when disabled, or not energized, isolates the DATA terminal 14 from the output end of the register 13. The information in each stage of the shift register is sequentially transferred through the data output transmission gate 21 to the data terminal 14. Thus, the information in the main memory 11 is non-destructably read and presented in serial form to the data terminal 14.

The operation of the fuse system incorporating the memory of the present invention will now be described. A serial data work, representing a fuse setting, is initially applied to the data terminal 14 and shifted left into the shift register 13. A write signal W is then generated on write line 59. The write transmission gates 15-1 to 15-N are energized and transfer a polarizing voltage of $+V_P$ or $-V_P$, depending on the state of each stage of the shift register, to the control inputs 57-1 to 57-N, respectively. The transistors 11-1 to 11-N in the main memory 11 are set to the first threshold voltage in response to an input of $+V_P$ and to the second threshold voltage in response to an input of $-V_P$. The write operation for the main memory is thus completed, the data word representing the fuse setting being stored in the main memory where it is retained without the application of standby power.

In order to read the data word stored in the main memory, the read signal R is generated on read line 61 and on one input of the OR gate 55 and the similar OR gates (not shown). In response, the OR gates are activated to enable the respectively associated read voltage transmission gates such as gate 19 and the similar read voltage gates (not shown) to supply the read voltage $-V_R$ to the respective control inputs 57-1 to 57-N of the transistors 11-1 to 11-N in the main memory 11. The read voltage $-V_R$ causes the transistors 11-1 to 11-N which have assumed the first threshold to be energized, or enabled, and produce the voltage $(V_D - V_{t1})$ at their respective outputs, while the transistors 11-1 to 11-N which have assumed the second threshold voltage are not enabled by the read voltage $-V_R$, and thus zero volts continue to be produced at their respective outputs.

At the same time, the read signal R on the read line 61 energizes the read transmission gates 17-1 to 17-N to couple the voltage appearing at the outputs of the transistors 11-1 to 11-N into each stage of the shift register 13. A signal is then applied to the control input 58 of the data output transmission gate 21 to energize the gate and the data word in the shift register is serially transferred through the data output transmission gate to the data terminal 14.

Since the main memory has a non-destructive readout, the read operation may be performed as often as desired. Further, since the main memory is non-volatile, the information stored therein is retained subsequently to the read out, and without the application of standby power.

The fire sequence is initiated by the firing of an explosive projectile. In response, the fire logic 43 resets the counter 41 and then generates a FIRE command on output 45. In the same manner as described for the read signal R, the FIRE command enables the associated OR gates and read voltage transmission gates, such as OR gate 55 and gate 19, to apply a read voltage $-V_R$ to the control input 57-1 to 57-N of the transistor 11-1 to 11-N. Also, the FIRE command enables the second input of the AND gates 39-1 to 39-N for transferring the information stored in the main memory 11 to the set inputs of the counter 41. The fire logic 43 then supplies clock signals on output 49 to index the counter. The counting continues until the counter overflows, generating a carry signal or output lead 51. The carry signal or lead 51 sets the detonate flip-flop 53 to provide a detonate command on output lead 54 for triggering detonation of the explosive projectile.

It is evident that various modifications may be made in the system described herein without departure from the scope of the invention. Accordingly, the invention is not to be considered limited by the description, but only by the scope of the appended claims.

I claim as my invention:

1. A non-volatile memory for use in a timing control system, comprising:

a non-volatile main memory having a plurality of storage bits, each of said bits comprising a field effect transistor having gate, drain and source electrodes and selectively responsive to first and second polarizing voltages of predetermined amplitude and polarity for being polarized to corresponding first and second stable threshold voltage states, buffer means for receiving binary data to be set in said main memory, said buffer means being responsive to received binary data for generating a plurality of outputs comprising polarizing voltages representative of the binary data, and write transmission gate means for coupling the plurality of polarizing voltage outputs of said buffer means to corresponding storage bits of said main memory and for selectively polarizing the storage bits of said main memory to set the binary data therein.

2. The memory system of claim 1 wherein each of said polarizing voltage outputs of said buffer means is applied between the gate electrode and the source electrode of the transistor comprising the corresponding storage bits of the memory.

3. The memory system of claim 2 wherein a positive polarizing voltage output from said buffer means sets a storage bit transistor to the first stable voltage threshold state and a negative polarizing voltage output from said buffer means sets a storage bit transistor to the second stable voltage threshold state.

4. The memory system of claim 1 further including means for interrogating each of said storage bits to determine the stable voltage threshold state to which each bit is set.

5. The memory system of claim 4 wherein said interrogating means includes:

means for applying a read voltage to the gate electrode of each of said transistors, said read voltage being greater in magnitude than one of said first and second stable threshold voltages.

6. The memory system of claim 5 wherein the amplitude of said read voltage is less than the amplitude of said polarizing voltages.

7. The memory system of claim 6 wherein the amplitude of said read voltage is less than the amplitude of the other of said first and second threshold voltages.

8. The memory system of claim 4 wherein:

said interrogating means is coupled to said buffer means to transfer the information in said main memory to said buffer means, and said buffer means is operable to produce at its output the binary data information transferred thereto from said main memory.

9. The memory system of claim 1 wherein there is further provided means for supplying a write command to said write transmission gate means subsequently to completion of receipt of the binary data in said buffer means to initiate coupling of the polarizing voltage outputs of said buffer means to said main memory.

10. The memory system of claim 9 wherein there is further provided:

means for interrogating each of said storage bits to determine the stable voltage threshold state to which each bit is set, utilization means for receiving the binary data stored in said memory, and means for supplying a transfer command to said interrogation means for interrogating said memory to transfer the binary data from said memory to said utilization means.

11. The memory system of claim 10 wherein said utilization means comprises:

a settable counter, and means for coupling the output of said memory to said counter to set said counter to a count corresponding to the binary data contained in said main memory.

12. The memory system of claim 11 wherein there is further provided:

means for generating a fire command upon firing of an explosive projectile, said transfer command means responds to said fire command to generate said transfer command, and said coupling means responds to said fire command to enable the transfer of the binary data from said memory to said counter.

* * * * *